United States Patent [19]

Baba et al.

[11] Patent Number: 4,703,468
[45] Date of Patent: Oct. 27, 1987

[54] OPTICAL DISC TRACKING SERVO CIRCUIT HAVING COMPENSATION FOR DISC DEFECTS AND EXTERNAL DISTURBANCES

[75] Inventors: Hideyuki Baba; Shigeyoshi Mitsumori, both of Kosai, Japan

[73] Assignee: Sony Corporation, Tokyo, Japan

[21] Appl. No.: 740,841

[22] PCT Filed: Sep. 29, 1984

[86] PCT No.: PCT/JP84/00465
§ 371 Date: May 21, 1985
§ 102(e) Date: May 21, 1985

[87] PCT Pub. No.: WO85/01605
PCT Pub. Date: Apr. 11, 1985

[30] Foreign Application Priority Data

Sep. 30, 1983 [JP] Japan ................... 58-180606

[51] Int. Cl.⁴ ............... G11B 7/095; G11B 21/10
[52] U.S. Cl. .......................... 369/44; 369/54; 369/58
[58] Field of Search .............. 369/46, 45, 44, 43, 369/54, 58; 250/201 DF

[56] References Cited

U.S. PATENT DOCUMENTS

| 4,338,682 | 7/1982 | Hosaka et al. | 369/46 |
| 4,406,000 | 9/1983 | Shoji et al. | 369/44 |
| 4,536,864 | 8/1985 | Van Rosmalen | 369/44 |
| 4,587,644 | 5/1986 | Fujiie | 369/46 |

FOREIGN PATENT DOCUMENTS

| 0093582 | 11/1983 | European Pat. Off. |
| 0152165 | 8/1985 | European Pat. Off. ............ 369/54 |
| 55-070941 | 5/1980 | Japan . |
| 57-046357 | 3/1982 | Japan . |
| 57-183671 | 11/1982 | Japan . |
| 58-045666 | 3/1983 | Japan . |
| 58-105435 | 6/1983 | Japan . |
| 59-38936 | 3/1984 | Japan . |
| 2090437 | 7/1982 | United Kingdom . |
| 2110843 | 6/1983 | United Kingdom . |

Primary Examiner—Raymond F. Cardillo
Assistant Examiner—Robert A. Weinhardt
Attorney, Agent, or Firm—Stephen F. K. Yee

[57] ABSTRACT

The present invention pertains to an improvement for a tracking servo circuit which controls the tracking of an optical pickup on an optical disc in an apparatus for reproducing a sound or image recorded on the optical disc. The present invention is characterized by the provision of a circuit for detecting modulation of an RF signal from the optical pickup caused when the optical pickup encounters a defect such as a flaw in the disc or dust adhering thereon, a circuit for detecting modulation of the RF signal caused when an impact is externally applied to the optical pickup, and an adjusting circuit which decreases the loop gain of the tracking servo circuit when the former modulation is detected and which increases the loop gain when the latter modulation is detected, whereby the responsiveness of the optical pickup is improved and track jumping prevented.

2 Claims, 11 Drawing Figures

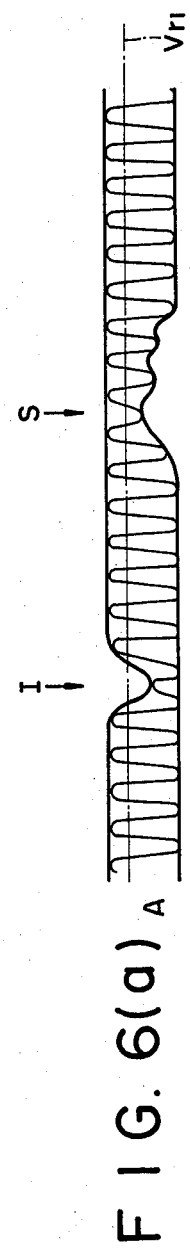
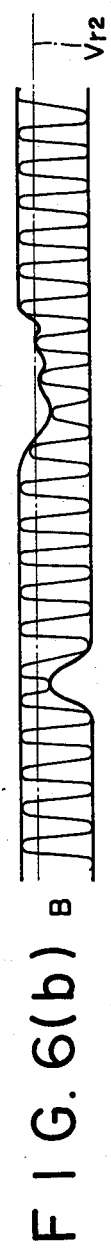
FIG. 6(a)
FIG. 6(b)
FIG. 6(c)
FIG. 6(d)
FIG. 6(e)

OPTICAL DISC TRACKING SERVO CIRCUIT HAVING COMPENSATION FOR DISC DEFECTS AND EXTERNAL DISTURBANCES

TECHNICAL FIELD

This invention relates to a tracking servo control circuit for maintaining the tracking of an optical pickup on the track of an optical disc in a proper condition in an apparatus for reproducing information recorded on the optical disc such as a video disc, a digital audio disc or the like used as a recording medium.

BACKGROUND ART

Optical discs are recording media which store video and/or audio information on their surfaces in the form of spirally arranged pits or relief information. The recorded information on such optical discs is reproduced through an optical pickup. Namely, the optical pick-up spots a light ray such as a laser beam or the like along the spiral recording track, while converting the reflected light into an electrical signal. A servo mechanism is usually employed to move the optical pickup with accurate tracing along the recording track.

Typical servo mechanism control methods include the so-called 3-spot method, push-pull method and DPD (Differential Phase Detection) method. In any one of these methods, a tracking error is detected from the reflecting position on an optical disc of a spot light ray from an optical pickup, the intensity of reflected light or the like. The tracking of the optical pickup is controlled by feeding back the tracking error signal to a control mechanism such as an objective lens or a mirror of the optical pickup device.

Shown in block diagram in FIG. 1 is an example of such a servo mechanism circuit, in which denoted at 1 is a rotating optical disc, at 2 an optical pickup capable of shooting a laser beam on the optical disc 1 while converting the reflected light from the optical disc 1 into electrical signals, at 3 an operational amplifier circuit for producing a tracking error signal according to the output of the optical pickup 2, and at 4 a drive circuit for driving a tracking coil provided in the optical pickup 2. The tracking coil drives an objective lens or a reflecting mirror to adjust the laser spotting position on the recording track of the optical disc 1.

The reference numeral 5 denotes an integral circuit which detects a DC component of the tracking error signal. After amplification by a power amplifier 6, the output of the integrating circuit 5 drives a thread feed motor 7 or a linear motor which moves the optical pickup 2 as a whole. Designated at 8 is a spindle motor which rotates a turntable, and at 9 is a feed screw.

When the disc 1 is flawless, the laser beam from the optical pickup 2 can trace the track correctly by the servo mechanism of the tracking servo control circuit. However, an instaneous drop of the intensity of the reflected light is caused, as if there were a tracking error, when there is a dust on the optical disc 1 or a defect or flaw such as an occluded air bubble in the recorded track. As a result, the optical pickup is caused to shift from the correct track to an adjacent track (i.e., a track jump), producing a large disturbance in the reproduced sound or image in some cases.

The instantaneous variation of the tracking error of this sort, which is caused by an abrupt drop in the reflected light intensity, can be prevented to some extent by decreasing the loop gain of the servo mechanism circuit. However, the reduction of the servo mechanism circuit loop gain makes it difficult to control the objective lens or reflecting mirror in conformity with impact or vibration externally applied to the reproducing apparatus.

For these reasons, it has been extremely difficult for the conventional servo mechanism circuit to maintain the optical pickup in correct tracking against both conditions of defects on optical discs and external mechanical disturbances.

DISCLOSURE OF THE INVENTION

This invention has been made in consideration of the above-mentioned problems of the prior art. According to the invention, there is provided a tracking servo circuit for controlling the tracking of an optical pickup on an optical disc, wherein the control is effected with a tracking error signal and a loop gain contol signal derived from an RF signal generated from said optical pickup, said tracking servo circuit-comprising: first means adapted for producing a first detection signal upon detecting an upper envelop of the RF signal modulated when the optical pickup comes across a defect on the optical disc; second means adapted for producing a second detection signal upon detecting a lower envelop of the RF signal modulated when an external shock is applied to the optical pickup; first adjusting means for setting the loop gain of the tracking servo circuit at a first predetermined gain upon receipt of said first detection signal; and second adjusting means for setting the loop gain of the tracking servo circuit at a second predetermined gain higher than said first gain upon receipt of said second detection signal.

The tracking servo circuit according to the present invention can change its loop gain upon detection of a defect on an optical disc or an externally applied impact, thereby allowing the optical pickup to trace the track of the optical disc accurately. Namely, according to the invention, a drop in the read-out level of recorded information due to a flaw or dust adhering on the optical disc and a drop in the amplitude of recorded information caused by a mechanical shock or other external disturbance are detected separately to control the servo gain in response to the resulting detection signals. Thus, the servo gain is lowered to render the servo control circuit insensitive to an abnormal tracking error signal resulting from tracing of a defect on the optical disc, but is increased to cope with a vibration caused by an external disturbance, thereby to maintain accurate tracking of the optical pickup against vibrations.

BRIEF DESCRIPTION OF THE DRAWINGS

In the accompanying drawings:

FIGS. 6(a) through (e) are explanatory, waveform diagrams showing the operation of the circuit shown in FIG. 5.

THE BEST MODE FOR CARRYING OUT THE INVENTION

Figure 1:
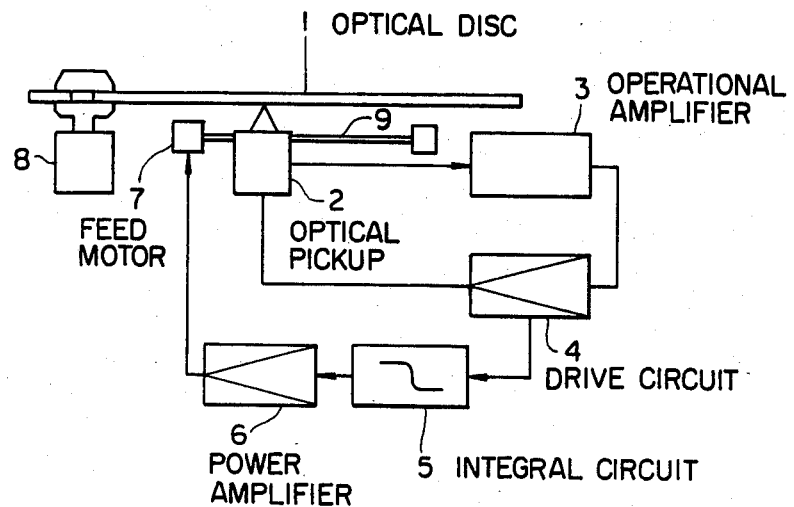
FIG. 1 is a block diagram showing a conventional tracking servo circuit.
Figure 2:
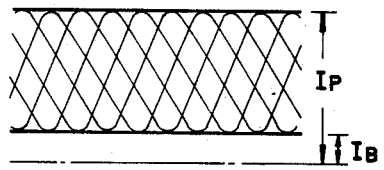
FIG. 2 is an eye pattern of RF signal from an optical pickup.
Figure 3:
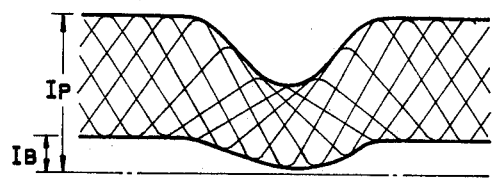
FIG. 3 is an example of an eye pattern of RF signal generated at a defective portion of an optical disc.

It is known that the output signal (hereinafter referred to as "RF signal" for brevity) of an optical pickup draws, as shown in FIG. 2, an eye pattern between a signal level $I_P$ corresponding to the total reflection and a signal level $I_B$ corresponding to spotting of the laser beam on a pit of the optical disc when the optical pickup 2 correctly travels on the recording track. The reflected light ray is, however, instantaneously dropped when the laser beam is spotted on deposited dust or air bubble on the optical disc, producing an RF signal with its signal level $I_P$ being lowered as shown in FIG. 3. On such an occasion, a track jump is induced by production of a spike-like tracking error signal.

Figure 4:
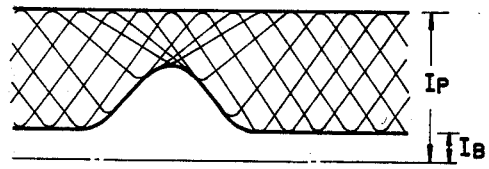
FIG. 4 is a example of an eye pattern of RF signal generated by a mechanical shock.

If an external impact or vibration is applied to the optical disc during reproduction, an RF signal with a smaller modulation level is produced as shown in FIG. 4 due to defocussing or detracking resulting from the variation in the relative distance between the optical pickup and disc, though the total reflection level $I_P$ remains unchanged. Consequently, the tracking servo circuit is operated by the tracking error signal which is produced at that time, controlling the laser spot in such a manner as to trace the track. However, since the tracking error signal resulting from a shock has a high frequency variable component, a tracking servo circuit with a low loop gain is unable to control the objective lens or reflecting mirror in response to the tracking error signal, causing track jumps.

The tracking servo circuit according to the present invention is arranged to constantly detect both a first envelop of the RF signal which is modulated as the optical pickup traces a deposited foreign matter on an optical disc or a defect such as air bubble occluded in the disc, and a second envelop of the RF signal which is modulated by a tracking error when an impact or other shock is applied from outside, thereby automatically adjusting the responsiveness of the tracking servo mechanism of the optical pickup to prevent track jumps.

Figure 5:
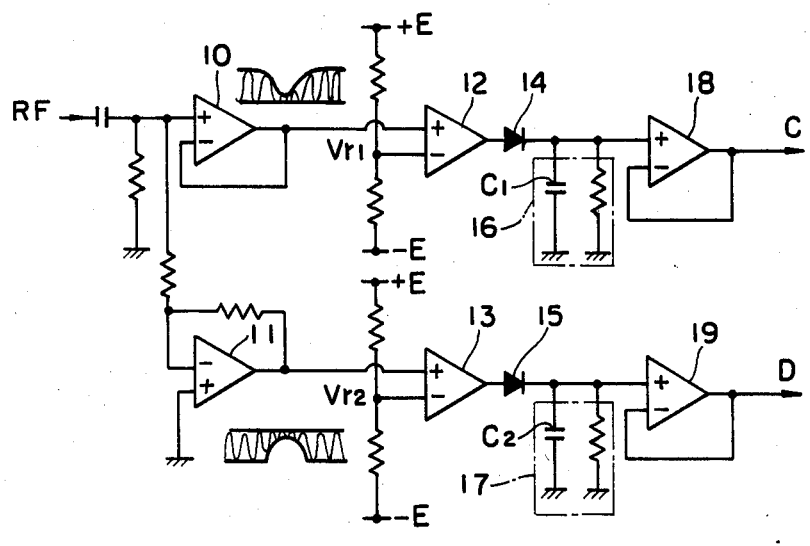
FIG. 5 is a block diagram, showing an example of the circuit for detecting the envelop of the RF signal.

FIG. 5 illustrates a circuit for detecting abnormality of an RF signal embodying the present invention, in which indicated at 10 is a positive phase amplifier, at 11 is a negative phase amplifier, at 12 and 13 are comparators which are applied with predetermined reference voltages $V_{r1}$ and $V_{r2}$ at one input terminal, respectively, at 14 and 15 are diodes, at 16 and 17 are time constant circuits, and at 18 and 19 are output amplifiers.

The operation of this circuit is now explained with reference to the waveform diagrams in FIGS. 6(a) to 6(e).

Shown in FIG. 6(a) is the waveform of output A of the RF signal amplifier 10 in a case where the optical pickup 2 comes upon a defective portion of the optical disc at point I, receiving an external impact at point S. In this case, the inverse phase amplifier 11 produces output B with a waveform as shown in FIG. 6(b).

The output A of the positive phase amplifier 10 is compared with the reference voltage $V_{r1}$ by the succeeding comparator 12 and, only when it is at a lower voltage level than the reference voltage $V_{r1}$, the output signal flows through the diode 14 to charge a capacitor $C_1$ of the time constant circuit 16. Accordingly, as shown in FIG. 6(c), the output amplifier 18 produces a detection signal C corresponding to the modulated portion of the RF signal at point I. However, the comparator 12 does not produce an output signal for point S since the modulated portion of the RF signal at point S is of a high level and, therefore, no detection signal is produced at the output terminal of the amplifier 18 for the modulation at point S.

On the other hand, the output signal of the comparator 13, which is supplied with the output B of the inverse phase amplifier 11, flows through the diode 15 only when the output B is at a lower level than the reference voltage $V_{r2}$, detecting only the modulation at point S and not the modulation at point I. Thus, the detection signal D is produced by the output amplifier 19 (FIG. 6(d)).

Figure 7:
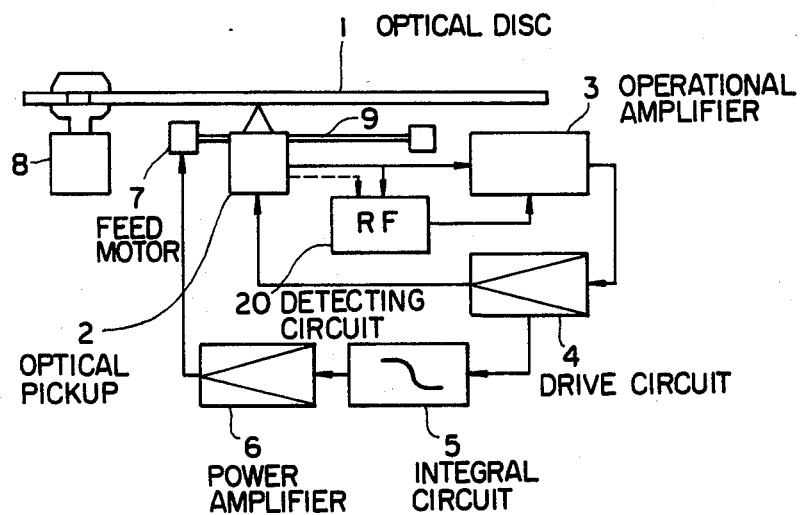
FIG. 7 is a block diagram showing an example of the tracking servo circuit according to the present invention.

Accordingly, the above-described circuit can distinguish the causes of distortion of RF signal which is produced by the optical pickup, and can control the loop gain E of the tracking servo circuit in such a manner as to lower the loop gain E in response to the detection signal C which is produced upon detection of a flaw or dust adhering on the optical disc, and to increase the loop gain E in response to the detection signal D which is produced upon detection of an externally applied impact or vibration, to prevent track jumps (FIG. 6(e)). Namely, as shown in FIG. 7, if the above-described abnormality detection circuit 20 is added to a conventional circuit to adjust, for example, the gain of the operational amplifier circuit 3, it becomes possible to lower the responsiveness of the tracking servo by the detection signal C for preventing track jumps due to dust or flaws on a disc and to enhance the responsiveness by the detection signal D to let the laser beam trace the recording track with high sensitivity against vibrations.

It is to be understood that FIG. 5 shows merely an embodiment for detecting the envelop of the RF signal, and it may be substituted by other circuit arrangements if desired. Although the adjustment of the loop gain of the tracking servo circuit is effected by varying the gain of the operational amplifier circuit 3 in response to the signals from the output amplifiers 18 and 19 in the embodiment of FIG. 7, it is also possible to supply the signals to a different part of the tracking servo circuit where the loop gain can be changed, for example, to the drive circuit 4 to vary its output level.

As described hereinabove, the tracking servo circuit according to the present invention constantly checks the RF signal from an optical pickup and, upon detection of a deficiency or a defect, adjusts the loop gain of the circuit to a smaller or greater value depending upon the cause of the dificiency or defect, thereby maintaining an optimum loop gain (responsiveness) for the circuit to prevent track jumps which would otherwise be caused by flaws on optical discs or externally applied vibrations.

INDUSTRIAL APPLICABILITY

An optical reproduction apparatus equipped with the tracking servo circuit according to present invention is particularly useful for reproducing signals on optical discs with flaws or other defects or for mounting on vehicles or automobiles on which the apparatus is subjected to violent vibrations.

We claim:

1. A tracking servo circuit for controlling the tracking of an optical pickup on an optical disc, wherein the control is effected with a tracking error signal and a loop gain control signal obtained from an RF signal generated from said optical pickup, said tracking servo circuit comprising:

first means adapted for producing a first detection signal upon detecting an upper envelop of the RF signal modulated when the optical pickup encounters a defect on the optical disc;

second means adapted for producing a second detection signal upon detecting a lower envelop of the RF signal modulated when an external disturbance is applied to the optical pickup;

first adjusting means for setting the loop gain of the tracking servo circuit at a first predetermined gain different from a normal circuit gain, upon receipt of said first detection signal; and second adjusting means for setting the loop gain of the tracking servo circuit at a second predetermined gain different from the normal circuit gain and higher than said first gain, upon receipt of said second detection signal.

2. The tracking servo circuit of claim 1, wherein said first means comprises a first comparator adapted to compare a positive phase signal level of the RF signal with a first predetermined reference level and produce said first detection signal when said positive phase level drops below said first reference level, and said second means comprises a second comparator adapted to compare a negative phase signal level of the RF signal with a second predetermined reference level and produce said second detection signal when said negative phase signal level drops below said second reference level.

* * * * *